J. A. ANDERSON & H. M. MIDDLETON.
EGG REGISTER.
APPLICATION FILED DEC. 16, 1907.
903,430.
Patented Nov. 10, 1908.
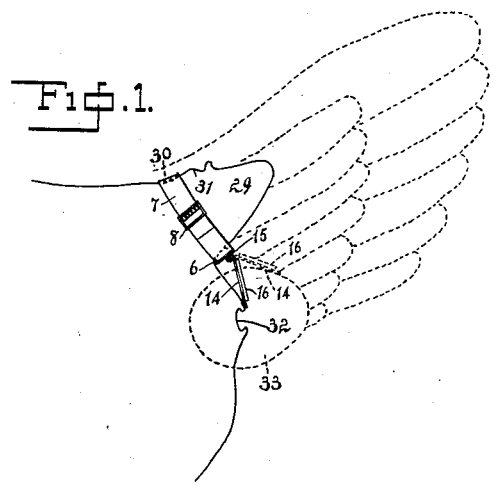
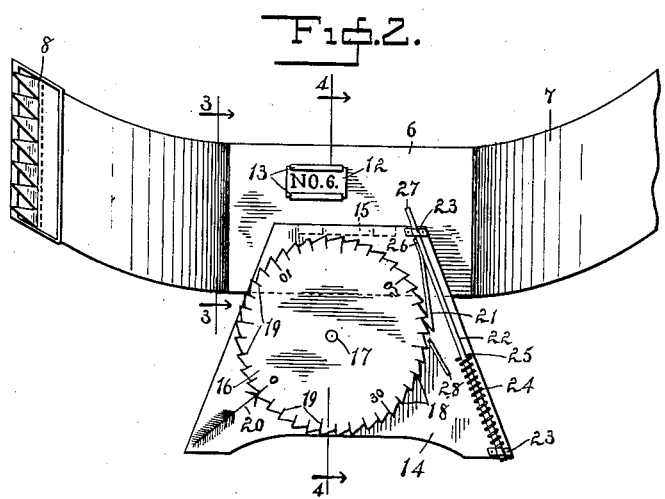
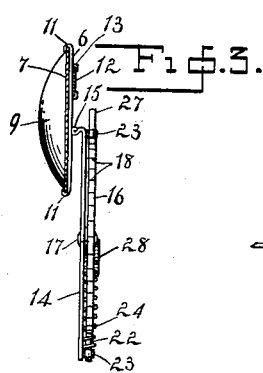
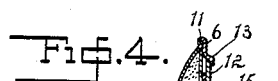
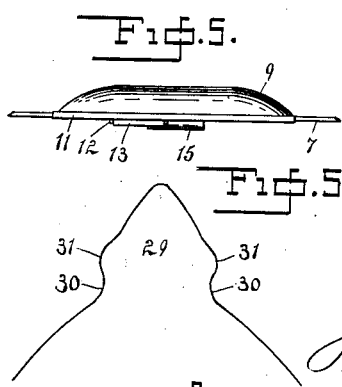
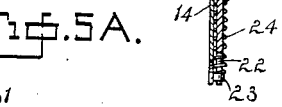
WITNESSES:
Mathew J. Marty
C. F. Bassett
INVENTORS
Joseph A. Anderson
Howard M. Middleton
BY
Frederick Benjamin
ATTY.

UNITED STATES PATENT OFFICE.

JOSEPH A. ANDERSON AND HOWARD M. MIDDLETON, OF ARGYLE, WISCONSIN.

EGG-REGISTER.

No. 903,430.     Specification of Letters Patent.     Patented Nov. 10, 1908.

Application filed December 16, 1907. Serial No. 406,664.

*To all whom it may concern:*

Be it known that we, JOSEPH A. ANDERSON and HOWARD M. MIDDLETON, citizens of the United States, residing at Argyle, in the county of La Fayette and State of Wisconsin, have invented certain new and useful Improvements in Egg - Registers, of which the following is a specification.

Our invention relates to counting or indicating devices, and has special reference to that class in which provision is made for registering the total of a series of impulses imparted to the mechanical movements, and is particularly adapted to record the number of eggs laid by an individual fowl during the application of the contrivance.

The chief objects of our invention are to provide a registering counter for recording the total number of eggs laid by a hen or other fowl; to furnish a device for the purpose stated that can be attached directly to the fowl and be worn indefinitely, and to supply means for preventing injury or abrasion to the skin when the device is *in situ*.

Further objects of our improved poultry register are to furnish a means for applying a germicide to the fowl while the device is in position; to supply a registering mechanism that is simple in construction, readily attached and detached from the bird and that will be durable and accurate in its operation.

We accomplish the above objects by the use of the device illustrated in the accompanying drawing which forms a part of this application, and which consists, in a general way, of a base plate, a strap or band secured thereto and adapted to removably attach the same to the body of a hen beneath the feathers, and a pendant hinged to the said base and carrying a register, said pendant lying in the path assumed by an egg during its expulsion.

The mechanism above described and more fully set forth in the detailed account is shown in the following views:

Figure 1 is an outline diagram of the posterior portion of the body of a fowl showing the method of attaching the device thereto, and the action of the egg, shown in dotted outline upon the register operating mechanism. Fig. 2 is a rear elevation of the appliance removed from the fowl; Fig. 3 is a sectional view on the line 3—3 of Fig. 2; Fig. 4 is a section of Fig. 2 on the line 4—4; Fig. 5 is a top plan view of the base plate and pad with the pendant plate removed, and Fig. 5ª is an outline diagram of the rear portion of the body of a fowl seen from above.

Referring to the details of the drawing the numeral 6 indicates a base plate, rectangular in outline, which serves as a foundation for supporting the mechanism. This base is applied to the surface of a flexible band or strap 7. This band may be made of any suitable fabric, such as cloth or leather, but we prefer to employ an elastic webbing, as best adapted to afford a permanent security, when the device is to be worn for some time. This band is furnished with a clasp or buckle 8 which may be of any construction desired. Our preference, however is for the employment of a buckle that is not limited to spaced adjustments, the form shown meeting this requirement. To the under surface of said base 6 is attached a pad consisting of a casing or covering 9 inclosing an absorbent filling material 10. The said plate 6 is secured to the pad by its upper and lower margins, which are recurved as shown at 11 to form clasps which embrace the band 7 and the pad covering 9, clamping them securely in apposition. The said pad has two functions; to prevent chafing or undue pressure upon the fleshy parts which might be caused by the continuous tension of the elastic band, and also to afford a means of applying some insecticide. To facilitate the latter use we prefer to employ some porous material for the cover 9.

In order to identify the particular fowl whose record is to be kept a label 12 composed of a strip of card board, or other material, is inserted in a slot formed by upturned lips 13, formed integral with the plate 6. A pendant plate 14, hinged to the base plate at 15, carries a registering dial 16, pivoted to the said plate by a rivet 17. The edge of the dial is provided with ratchet teeth 18, and the face is furnished with marginal graduations 19, forming a scale for determining the angular movement of the dial, and upon the pendant plate 14 is inscribed an index mark in the form of an arrow 20, to indicate the initial point from which to compute the number of impulses given to the dial. The said dial is operated by a pawl 21, secured to a plunger rod 22, mounted to slide in guides 23, attached to the pendant plate. The said plunger rod is held in extended position by a coiled spring 24, surrounding the rod, abutting at its lower end against the guide plate 23, and the upper end engaging a pin 25, which transfixes the said rod. The dial is actuated by a pawl 26 carried by the plunger rod 22, and adapted to engage the ratchet teeth 18 when the plunger rod moves upward after being operated in the following manner, the pendant plate 14 being hinged to the base plate 6 is capable of being turned upon its hinge until the upper end 27 of the plunger rod will impinge against the face of the base plate, a continuation of the movement serving to slide the said rod in its guides and causing the pawl 21 to pass over the teeth of the ratchet and then to ride upon an inclined cam-plate 28, thus throwing the pawl out of engagement with said teeth. When the pendant plate is allowed to return to its initial position, the spring 24 will restore the plunger rod to its extended position and the pawl 21 will move the dial one notch or step, which will be indicated by the location of the scale graduations relatively to the index 20. The upper end 26 of the pawl abutting against the upper guide 23 acts as a stop for plunger rod. The means for swinging the pendant plate upon its hinge to operate the dial will be hereinafter described.

Having thus set forth in detail the construction of the device and the mechanical operations involved, we are prepared to understand the application of the instrument to the particular purpose in view including its attachment in operative position to the body of the fowl and the relation of the mechanism to the structural formation of the bird by means of which a registration upon the dial is obtained whenever the fowl lays an egg.

We will consider the application of the appliance to the body of a hen. Fig. 1 is a diagrammatic representation of the posterior part of the body of a common barn-yard fowl, the feathers being removed to disclose the contour of the fleshy parts. The retaining strap or band 7 is applied beneath the feathers, and clasped snugly about the base of the stump 29 from which the tail feathers spring, and close to its attachment to the body of the fowl. At this point there is a decided depression or constriction 30, made by the prominence of the parts 31 posteriorly thereto, and when properly adjusted there is no difficulty in retaining the apparatus in place.

The base plate 6 with its pad 9 lies directly beneath the stump and the pendant plate assumes approximately a vertical position, its lower margin terminating just above the anal orifice 32 of the fowl. The device being applied in the manner described it will be evident that an egg, shown in Fig. 1 in the dotted outline 33, will, when extruded, come in contact with the pendant plate 14 and force the latter backward and upward swinging it upon its hinge center 15 to a sufficient extent to enable the pawl 21 to advance the dial one step, in the manner hereinbefore described. The stretching of the orbicular or constricting muscle of the anus during the extrusion of droppings will never be sufficient to move the pendant plate to such an extent as to affect the plunger, and consequently there will be no dial movement, and the lower margin of said plate 14 is elevated above the opening to prevent droppings from coming in contact therewith.

The entire device will be practically concealed from view beneath the feathers since the band is applied next to the skin. It is advisable in case of full feathered birds to pluck a few downy feathers directly beneath the pendant plate so as to allow it to assume a proper position.

The device may be removed during the moulting season or worn throughout the entire year if a complete record is desired.

Having thus described our invention what we claim as new and desire to secure by Letters Patent, is:—

1. In an indicating device, the combination of a register, said means adapted to be set in operation by an egg issuing from the fowl, operating means for said regrster and means for attaching the device to the body of a fowl.

2. In an egg indicating device, the combination with a base plate, means for attaching said plate to a fowl, a protective pad beneath the plate, registering mechanism flexibly attached to the plate, and operative means for the said mechanism.

3. In an indicating device, the combination of registering mechanism, operative means for said mechanism, means for adjustably attaching said device to a fowl, and means for protecting the body of the fowl from injury by the said attaching means.

4. In a registering device, the combination with a base plate, and means for attaching said plate to a fowl, of a member hinged to said plate, registering mechanism carried by said member, and operating means for said mechanism.

5. In a registering device, the combination with a base plate, and means for attaching said base plate to a fowl, of a pendant member, hinged connection between said member and the base plate, a dial pivoted to said pendant member, and means for operating said dial.

6. In a registering device, the combination of a base, a pad attached to said base, a band secured to the base and adapted to engage the body of a fowl, a member hinged to said base, an indicating dial carried upon said hinged member and furnished with graduations, and means for operating said dial, said means consisting of a pawl carried by the hinged member and adapted to engage said base when said member is swung upon its hinge.

7. In a registering device, the combination of a base, a porous pad attached to the base, an elastic band attached to the base and adapted to adjustably engage the body of a fowl, a member hinged to the base, an indicating dial carried on said member, and means for operating said dial, said means consisting of a pawl arranged to engage said dial when said member is turned upon its hinge.

In testimony whereof we affix our signatures in the presence of two witnesses.

JOSEPH A. ANDERSON.
HOWARD M. MIDDLETON.

Witnesses:
OLAF I. PAULSON,
L. WADDINGTON.